Patented Nov. 4, 1952

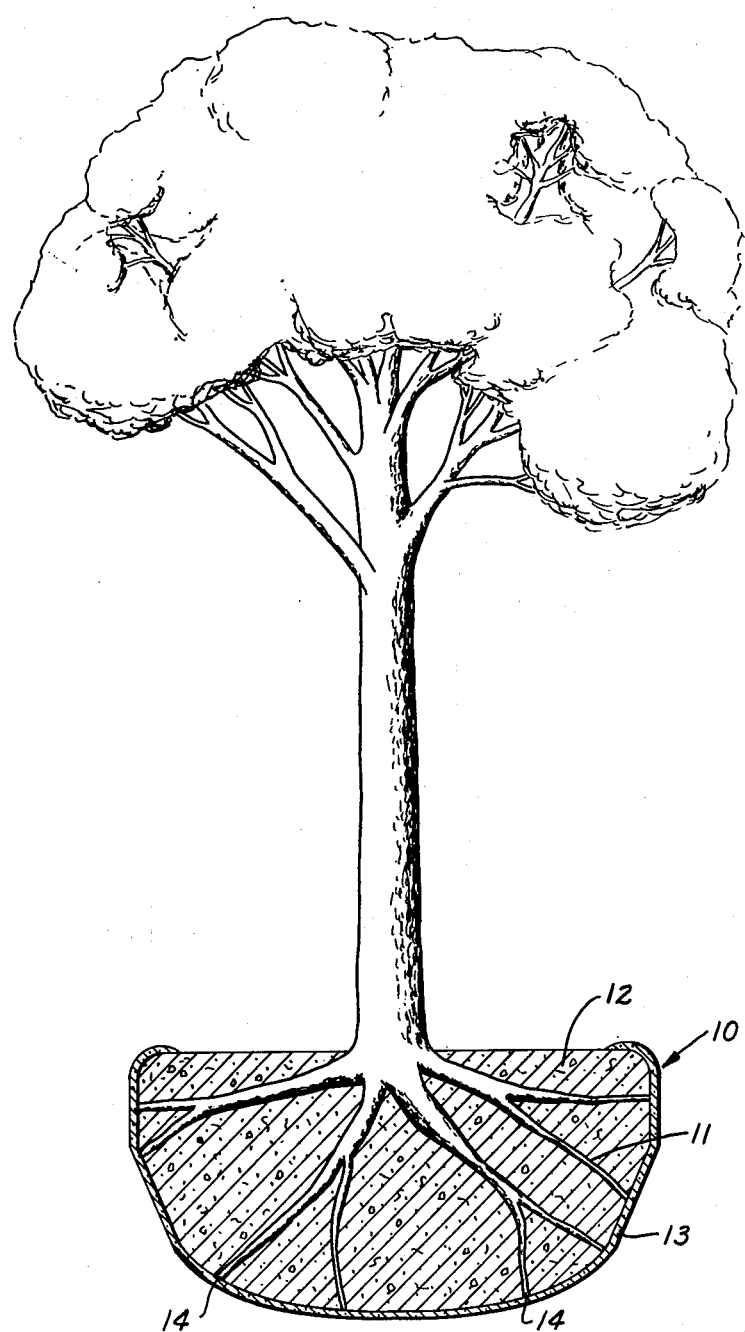

2,616,220

UNITED STATES PATENT OFFICE 2,616,220

METHOD OF PROTECTING TREES DURING TRANSPLANTING

William H. Welch, Jr., Romeo, Mich.

Application July 25, 1946, Serial No. 686,255

5 Claims. (Cl. 47—58)

The present invention relates to a method for providing a protective covering for the roots of plants being transplanted with a root ball of soil.

Many types of plants grown in nurseries for resale require several transplantings in order to confine the roots of the plant to a relatively small volume of earth. Otherwise, as in the case of the larger shrubs and trees, the roots would become so extended as to make transplanting difficult and costly at the time of sale and final transplanting.

The most satisfactory transplanting results are achieved for many types of plants by what is known as the root ball method of transplanting wherein the root ball comprises the main body of the roots still enclosed within the ball of soil in which the roots have grown, the roots and soil being dug up together, intact and undisturbed in their relationship to each other.

It is well known to nursery men that if a plant is to have the greatest chance of survival and the least retardation of growth upon being transplanted, it is important that the germinating cambium layer of the roots be protected from bruises and abrasion. In most plants the cambium layer is just beneath the thin root epidermis and acts similarly to the cambium layer of the bark of a tree, being the region of new root growth. It is consequently important that the roots be protected from abrasion which results when the root ball breaks or becomes loose during transplanting.

It is also common knowledge among nursery men that the fine feeler roots or root hairs which grow in the region near the root tips depend upon their intimate contact with the surrounding soil to absorb moisture and nutrient minerals necessary for the growth of the plant. If during transplanting the roots of the plant are shaken free of the adjacent soil, it will be necessary for new soil to settle around the root tips and root hairs so as to eliminate tiny air spaces between the root surfaces and the source of plant nutrition. Until this intimate contact between the root hairs and adjacent soil is reestablished, plant growth is retarded. Even the most careful transplanting methods will cut many of the extended root tips as a result of the necessity of confining the root ball within a size that may be conveniently handled. Failure of plant nutrition will be reduced to a minimum if the remaining root hairs and root tips are not disturbed within the soil in which they grow.

Further requirements in transplanting are to protect the roots from excessive temperature extremes, excessive dryness, and infection from any of the various fungi which would cause the cut root ends to be damaged, and subsequent deterioration of the plant tissue. It is also important to provide the proper chemical content and plant nutrition for the soil at the location of transplanting and to provide proper drainage, aeration, and support for the plant and roots. Rotting of the root ends have been found to poison the entire tree.

Accordingly a method of transplanting which permits the plant to be grown in its proper soil and which also provides for the transplanting of the adjacent soil in which the roots of said plant have grown, intact and undisturbed about said roots, has been a desired objective to be attained by nursery men.

In order to protect the plant and its root ball during transplanting, asphalt, and paraffin have been applied to the external surfaces of the root ball and to the exposed root ends thereof. Such coverings have not been entirely satisfactory. They are cumbersome and costly and frequently have not provided the proper drainage for the roots. Likewise, previous coverings have frequently failed to provide proper nutrition or mechanical protection for the roots or have necessitated a separation of the roots from the earth in which the roots have grown.

The problem of protecting the plant during transplanting becomes additionally complicated when the plant is finally sold from the nursery and replanted at its final location. Then the plant is no longer under the expert care of the nursery men and every known precaution is important if the plant is to survive.

It has therefore been a principal object of the present invention to provide during transplanting an inexpensive and efficient method for protecting the roots from damage by intermittent freezing and thawing, abrasion, and mechanical separation of the root elements from their surrounding soil.

Other objects of the present invention are to provide for an earthen root ball transplanted with a plant an economical and readily applied cushioning cover adapted to give the protection stated above and to supply the proper chemicals and fungicides to promote growth and to prevent decay of the plant and its roots.

Other objects of this invention will appear in the following description and appended claims, reference being had to the accompanying drawing forming a part of this specification wherein like reference characters designate corresponding parts.

The drawing shows a section through the root ball of a tree which has been prepared for transplanting in accordance with the methods of the present invention and which is balled and ready for shipment.

Before explaining the present invention in detail it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

In brief, the present invention provides a simplified and improved method of protecting the roots and root ends of a plant being transplanted by use of the root ball method of transplanting. The root ball shown generally as number 10 comprises the main body of the roots 11 together with the earth or soil 12 which encloses the roots. My method of protecting the roots 11 and root ball 10 includes the use of the protective covering 13 to be described in detail below and which preferably is a covering of earth applied in a moist, plastic condition either by hand or with a trowel or by spraying or dipping or any other satisfactory method to give the desired covering. The moist, plastic earth held in place by burlap or other covering material will solidify in place and will provide a protective shell or envelope which prevents much root damage. If desired, the covering may be frozen in place on the root ball.

I have found that such a covering provides an adequate and most efficient protection where applied, and may be applied to the entire surface of the root ball 10 or merely to the freshly cut root ends 14 thereof. When applied to the entire root ball 10, the coating 13 provides a cushioning layer of adherent, solidified earth that protects the root ball 10 and the exposed root ends 14 against temperature extremes, excessive dryness, and the like. Thus the cambium layer of the roots 11 is protected against abrasion, and the root tips and root hairs remain undisturbed in their intimate contact with the soil 12 of the root ball 10.

In the application of my invention clean cut root ends 14 are preferred. It is also desirable to apply the paste of earth as soon as possible after cutting the roots 11 so as to reduce the danger of fungus infection and oxidation which might otherwise cause rotting of the root ends 14. This paste also affords protection against abrasion of the roots 11 or breakage of the root ball 10.

In climates where the earth becomes frozen during cold seasons it is usually preferable to dig, transport and transplant a frozen root ball. The obvious advantages are that while the ground is frozen it is easier to dig up and preserve a root ball intact. Also the metabolism of the plant in the frozen state is at a minimum. In this instance, the protective layer of moist earth quickly solidifies as the water is turned to ice. However, it is to be understood that the present method of protecting the root ball and roots is applicable to any compact root ball, whether frozen or not.

Although a coating of moist earth when applied to an exposed cut root end 14 provides the necessary mechanical protection for the root ball 10, a suitable binder may be employed in certain instances to hold the protective covering 13 in a coherent mass when dried. This is particularly desirable when certain types of sandy soils are employed to form the covering 13. Many well known chemically inert pastes formed with a water soluble binder are also satisfactory for the protective coating 13. The important consideration is to preserve the root ball 10 intact and to provide a cushioning coating therefor which will readily blend with the surrounding soil in which the plant is transplanted so as to allow adequate drainage and to allow the future growth of the root tips.

It is apparent that the principal advantages of applying a protective coating 13 of moist earth are the ease with which said coating 13 may be applied, the economy and availability of the materials required, and the facility with which said covering 13 blends with the surrounding soil at the location of transplanting. Other advantages lie in the ease with which fungicides, such as mercuric chloride or formaldehyde, and plant growth promoting substances, such as for example, fertilizer, hormones, and vitamins, may be applied to the root ends 14 along with the protective covering 13.

The fertilizer or other growth promoting substances may be selected in accordance with the type of tree or shrub which is to be transplanted and in accordance with the particular soil requirements of the area in which the transplanting is to occur. Plants such as rhododendrons and blueberries, for example, requiring acid soil can be protected and their growth facilitated by mixing aluminum sulphate or the like acid reacting materials with the protective layer to produce a localized acidic condition.

From the foregoing, it will be seen that I have described a new protective coating which not only protects the root ball and the cut root ends thereof, but also compensates for deficiencies in the soil at the location where the plant is to be transplanted. My invention provides a method by which a protective covering of known consistency and formulation may be applied to a root ball during transplanting and enables the nurseryman to exercise a large degree of control at the location of transplanting to insure that the plant will have the ultimate chance of survival and the least retardation of growth.

I claim:

1. A process for providing an economical and readily vitalized protective covering to a plant earth root ball and the exposed root ends thereof and comprising the steps of applying a coherent paste of moist earth and plant nutrient materials to the external surfaces of said root ball and over the exposed root ends, and of allowing said paste to harden thereon.

2. In transplanting a growing plant with an earth root ball, the method of protecting the roots and cut root ends of said plant from abrasion and exposure and for protecting the root ball of said plant from breaking which comprises the steps of providing a coherent protective jacket over the root ends by applying a thick slurry of an earthen mixture to the surfaces of a freshly dug root ball as soon as the root ball is raised from the surrounding earth, and of allowing said slurry to harden thereon before moving the plant to the replanting site.

3. A process for promoting the health and growth of a plant at the site of transplanting, for hastening the healing of exposed cut root ends of a plant, and for protecting the roots and exposed cut root ends of said plant during transplanting, and comprising the steps of applying to a freshly dug earth root ball a coherent paste of moist earth chemically treated to provide additional plant nutrients to form a protective jacket covering the exposed cut root ends, thereafter allowing said paste to solidify before moving the plant to the transplanting site, and thereafter planting the root ball and protective jacket in the earth.

4. A process for providing an economical and readily vitalized protective covering for a frozen plant earth root ball and the exposed cut root ends thereof and comprising the steps of applying a coherent hardened jacket to the surfaces of a freshly dug earth root ball to cover the exposed root ends, said jacket comprising a coherent layer consisting of a paste of moist earth spread over the dug portions of the root ball and thereafter allowing the moist earth paste to freeze on said ball before moving the plant to the replanting site.

5. In transplanting a growing plant with an earth root ball, a method for protecting the roots and cut root ends of said plant from abrasion and exposure and for protecting the root ball of said plant from breaking and comprising the novel steps of treating a thick slurry of an earthen mixture with suitable chemicals to promote growth and health of the plant being transplanted, of applying said slurry to the surface of a freshly dug earth root ball and the exposed cut root ends thereof, and of allowing said slurry to solidify thereon before moving the plant to the replanting site.

WILLIAM H. WELCH, Jr.

REFERENCES CITED

The following references are of record in the file of this patent:

UNITED STATES PATENTS

| Number | Name | Date |
| --- | --- | --- |
| 1,424,829 | Kleb | Aug. 8, 1922 |
| 1,446,113 | Blackwell | Feb. 20, 1923 |
| 1,775,837 | Wedge | Sept. 16, 1930 |
| 1,775,838 | Wedge | Sept. 16, 1930 |
| 2,314,928 | Fischer | Mar. 30, 1943 |

FOREIGN PATENTS

| Number | Country | Date |
| --- | --- | --- |
| 42,007 | Norway | Oct. 12, 1925 |

OTHER REFERENCES

Farmers' Bulletin 1591, "Transplanting Trees and Shrubs," published Aug. 1929 by U. S. Dept. Agriculture, pp. 8, 9, 10, 11, 24 through 29.